United States Patent Office 2,773,601
Patented Dec. 11, 1956

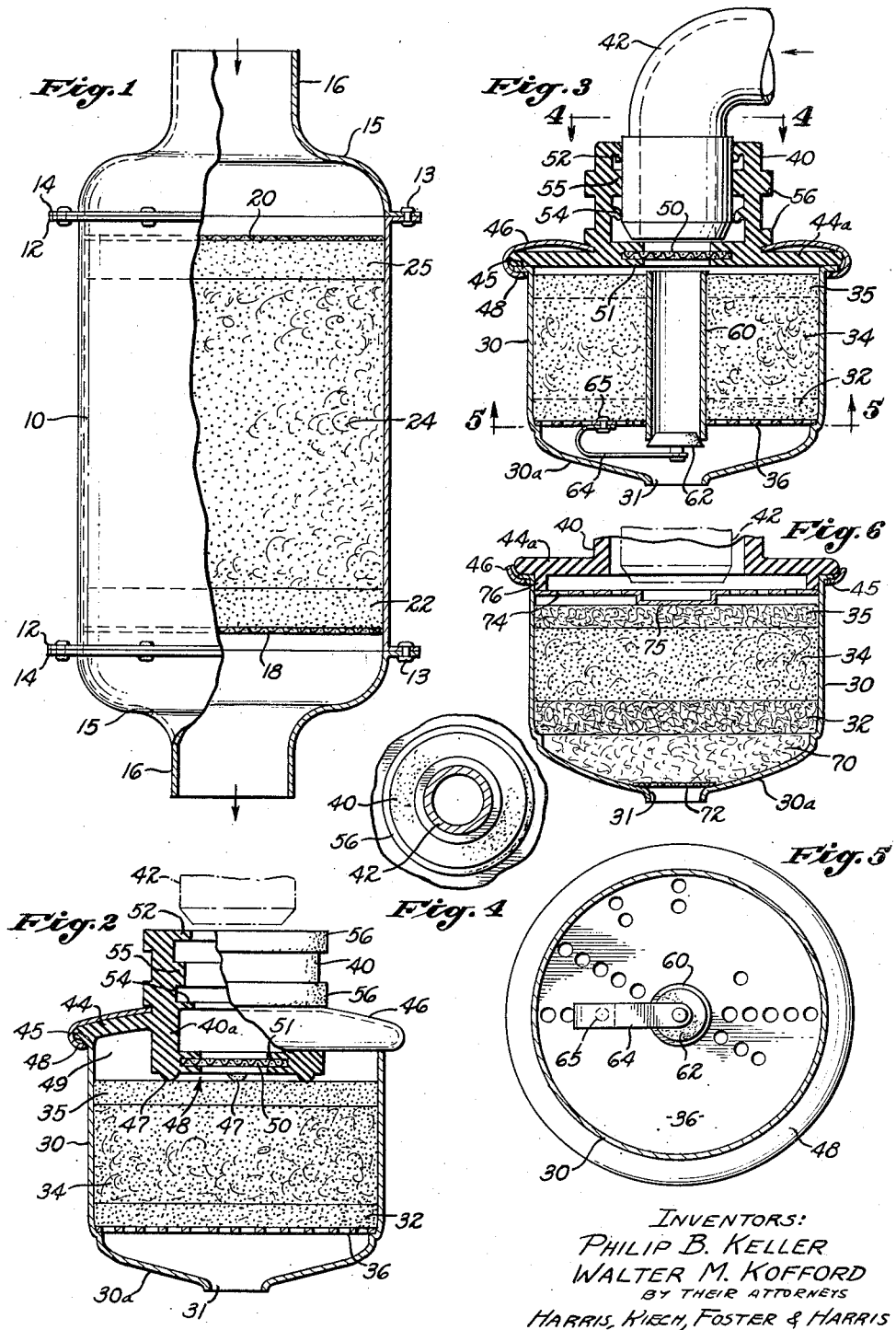

2,773,601

METHOD FOR CONSTRUCTING WATER FILTERS AND PRODUCT THEREOF

Philip B. Keller, San Jose, and Walter M. Kofford, Santa Clara, Calif., assignors to R. T. Collier Corporation, Los Angeles, Calif., a corporation of California Application September 21, 1953, Serial No. 381,416

12 Claims. (Cl. 210—120)

This invention relates to water filters, and while it has been developed from the standpoint of small water filters to be attached to faucets, the broader aspects thereof are by no means limited to producing small filters but may be applied also to the production of larger filters.

One object of the invention is to provide a method for the construction of water filters, including particularly the filtering elements thereof, which lends itself to low cost production of highly efficient filters.

Another object of the invention is to provide a method for water filter production which is particularly adapted to the employment of activated charcoal and the like as a principal filtering medium.

Still another object of the invention is to provide an efficient filter construction wherein loose filtering material, such as activated charcoal is effectively retained in operative position in the casing by porous means which also may constitute a filtering agent.

Additionally, it is an object of the invention to provide a method by which loose filtering material, such as activated charcoal, or other appropriate filtering medium, is positioned in a filter housing between porous layers of material which may also serve as filtering means, such layers containing bonding means which is made effective by heating the whole unit whereby such layers are rigidified, whereby to retain the loose filtering medium in operative position under normal lower operating temperatures.

Other objects of the invention and various features of construction thereof will become apparent to those skilled in this art upon reference to the following specification and the accompanying drawing wherein certain embodiments of the invention are illustrated.

In the drawing:

Fig. 1 is partly a longitudinal section and partly an elevation showing one construction embodying the principal aspects of this invention, this structure being adapted for connection at its opposite ends into a line or to various pieces of equipment as may be desired;

Fig. 2 is a vertical section through a small type of filter adapted to be attached to a faucet from which it depends, a portion of the filter being shown in elevation;

Fig. 3 is a vertical section through a modified form of filter adapted to be attached to a faucet in the same manner as that of Fig. 2;

Fig. 4 is a view taken on the line 4—4 of Fig. 3;

Fig. 5 is a cross-sectional view taken on the line 5—5 of Fig. 3; and

Fig. 6 is a vertical section showing a further modification.

All of the structures shown in the drawing are illustrated as being circular in cross section and comprising a tubular outer casing. In the form of Fig. 1 the outer casing is shown as being somewhat elongated and in the form of a shell 10 provided with flanges 12 at its upper and lower ends, these flanges being in turn bolted or riveted at 13 to flanges 14 of upper and lower connections 15 having reduced necks 16 for attachment in any suitable manner to lengths of hose or other pieces of mounting equipment. In the lower portion of the shell 10 there is appropriately fixed, as by frictional wedging or otherwise, a woven wire supporting screen 18 and in the upper portion of the shell 10 there is similarly fixed a similar screen 20. Disposed upon the lower screen 18 is a hardened, porous layer 22 of material presently to be described which acts as a lower filter element. Disposed upon the hardened layer 22 is a bed 24 of loose filter particles which may be activated charcoal, and preferably is activated charcoal for many intended purposes, but might be other filtering material according to the particular filtering function to be performed. Disposed upon the upper surface of the filtering bed 24 is another hardened layer 25 which is like or is similar to the porous layer 22, the screen 20 resting upon this layer 25.

In practice the layers 22 and 25 contain a small proportion of a thermosetting resin to act as bonding material and a large proportion of a granular filtering material. Where activated carbon is used for the filter bed 24, the granular material used in the layers 22 and 25 desirably also is activated carbon. A satisfactory thermosetting resin has been found to be phenol-formaldehyde monomer which initially is in powdered form. Other granular material such as sand might be used in the layers 22 and 25, even if the filter bed 24 is activated carbon, and especially if the filter bed 24 is of a different type of granular filtering material from activated charcoal or carbon.

In practice, we have found that granular carbon which passes a 20-mesh screen but does not pass a 60-mesh screen is highly satisfactory for use both as the filter bed 24 and as a granular material in the hardened layers 22 and 25.

One reason for activated carbon of this size is that it offers the least resistance to water flow through the filter while at the same time accomplishing the desired filtering function. Commonly the purpose of activated carbon is to remove from domestic drinking water bad tastes and odors, including chlorine flavors, which are readily removable by adsorption. For other purposes it might be possible to use with a fair degree of satisfaction coarser activated carbon particles, and in other instances finer carbon particles where resistance to water flow effected thereby is of no material consequence. In using activated carbon or sand for the layers 22 and 25, it has been found desirable to employ about 15% (or between 10% and 20%) of powdered phenolformaldehyde monomer (or equivalent binder) and about 80% of activated carbon of the indicated particle size, because loss in activity is only about 10%.

Having assembled the parts as shown in Fig. 1, either with or without having attached the upper and lower connections 15 to the flanges 12 of the shell 10, the entire unit is then placed in a curing chamber and raised to a temperature in the order of 350° F. to 400° F. for a period of time to cause adequate setting of the phenolformaldehyde resin in the lower and upper layers 22 and 25. This time will be ordinarily approximately one hour, depending, of course, upon the sizes of the layers. Thus, the layers 22 and 25 are set in situ, and thereby permanently retain the loose filter bed 24 in operative position. While the screens 18 and 20 might possibly be removed, it is desired to retain them for future protection against damaging of the layers 22 and 25, as with a sharp instrument, as well as to assure good support for the layers 22 and 25 in the event that the device might later be dropped and these layers become cracked.

In the case of the smaller unit shown in Fig. 2 which is especially adapted for the attachment to the lower end of a faucet, a shell or casing 30 is employed, which also is cylindrical for a substantial portion of its length, this casing being integral with a downwardly tapered lower discharge end 30a having a central, relatively small circular discharge opening 31. In the casing 30 there is disposed a lower, hardened, porous filtering layer 32 like the layer 22 of the form of Fig. 1, and upon this layer 32 there is supported a filter bed 34 of loose filtering materials like the bed 24 of Fig. 1, and above the bed 34 there is disposed an upper, hardened, porous filtering layer 35 like the layer 25 of Fig. 1. The lower layer 32 is supported by a perforated screen member or plate 36 which is a punched or otherwise perforated metal sheet 36 or the like which replaces the woven wire screen 18 of the form of Fig. 1 but performs the same function. This perforated plate 36 may be held tightly in position as by wedging, welding or the like, or it may be retained merely by the layer 32 which is in fact cemented in position on the inner wall of the casing 30 by means of the hardened, heat treated phenol-formaldehyde resin or similar binder for the filtering particles, such as sand or activated carbon, which are used in the same manner as described for the layers 22 and 25 of the other form. Thus, in this form of Fig. 2, the two porous layers 32 and 35 are formed on opposite sides of the filter bed 34 of loose particles in the same manner as in the previously described filter structure.

The upper hardened layer 35, which constitutes a porous cap member confining the upper surface of the filtering bed 34 of loose filtering material, underlies a molded rubber tubular body 40 which is adapted to be positioned upon the lower end of the faucet 42 and frictionally retained thereby. This member 40 is provided with a wide, integral, annular, rubber flange 44 which extends outward and has its peripheral portion retained in engagement with the upper edge of an integral, outwardly directed flange 45 formed on the upper edge of the casing 30. The annular rubber flange 44, which also serves as gasket means providing a sealing connection between the casing 30 and the body 40, is held in position on the casing 30 by means of a metallic annular cover and clamp ring 46 whose lower edge portion 48 is rolled and peripherally clamped under the flange 45 of the casing 30, thereby binding together the various portions 44, 45 and 48. Below the annular rubber flange 44, the tubular body 40 has a downward integral extension 40a whose lower edge is spaced somewhat from the upper face of the hardened, filtering cap layer member 35, such spacing being maintained if desired by means of a few spaced downwardly directed rubber lugs 47 which may bear upon the upper face of the hardened filter layer 35 and insure against dislodgment of such layer 35. The lower end of the tubular member 40 is provided with a water passage 48 which passes water from the faucet 42 to the upper face of the hardened layer 35, whence it is distributed between the lugs 47 into the comparatively large annular water chamber 49 below the rubber flange 44. For the purpose of trapping particles of substantial size which might come in with the water stream through the faucet 42, a screen 50, which may be a woven wire screen, is preferably positioned to span the passage 48, this screen being retained by means of upper and lower rubber annular lips 51 integral with the rubber extension 40a.

To facilitate retention of the upper portion of the tubular body 40 on the faucet 42, the upper end of the body 40 is provided with an inwardly directed integral rubber flange 52, and an intermediate portion of the inner wall of the body 40 is provided with another inwardly directed flexible rubber flange 54. These flanges 52 and 54 serve as sealing lips which are deflected downward in the same manner as seen in Fig. 3 to increase their frictional contact with the outer wall of the faucet 42, water pressure from within the tubular body member 40 serving to increase the retentive power of such frictional engagement. To insure centering of the faucet 42 in the tubular body member 40, and to provide for additional frictional contact to retain the filter on the faucet 42, an inwardly directed annular rib 55 integral with the inner wall of the member 40 is employed, the inner face of this rib being of cylindrical configuration and of appreciable vertical extent so as to present considerable frictional contacting surface to the faucet wall. If desired to provide for additional strength in the tubular body 40, external reinforcing beads 56 integral with the body member 40 and externally disposed above the annular clamping member 46 may be provided.

With the above described structure of Fig. 2, the filter is readily installed on the lower end of a faucet 42 merely by forcing the rubber body member 40 upward over the faucet end whereby the inwardly directed lips 52 and 54 are rolled downward as seen in Fig. 3, these lips and the internal annular rib 55 providing adequate frictional contact to overcome that pressure drop produced in the filter or resistance offered to the water flow by the screen 50, the filter bed 34 and the rigidified lower and upper porous layers 32 and 35. The filtered water leaves the lower end of the filter by means of the previously mentioned discharge port 31.

A further modified form is shown in Figs. 3 to 5, this form also being of the smaller type adapted to be frictionally held on the mentioned faucet 42. Here, the same rubber, tubular body member 40 is provided as in Fig. 2, the same inwardly directed, downwardly deformable friction lips 52 and 54 being used and the same inwardly directed frictional engaging rib 55 being employed. The stiffening beads 56 in this instance are disposed in somewhat different relative positions but perform the same functions. In this case, however, no downward extension of the tubular body 40 is employed and the water chamber immediately above the upper rigid porous layer 35 is a shallow chamber which, however, serves well to distribute the water being supplied. Also the spacing lugs of the form of Fig. 2 are omitted. However, the screen 50 is retained and is held in position by inwardly directed positioning lips 51. In this particular arrangement the lips 51 and the screen 50 are in line with the integral rubber closure flange 44a which is radially directed and rests upon the outwardly directed annular flange 45 of the casing 30. In this particular instance the cover and clamp ring 46 assume a nearly flattened configuration, rather than the frusto-conical configuration shown in Fig. 2. However, its peripheral, inturned clamping edge 48 functions in substantially the same manner as with the structure of Fig. 2.

In the structure of Fig. 3, there are shown the same perforated supporting plate 36 for the filter unit 32, 34, 35 and the same tapered bottom wall 30a and central discharge port 31 as provided in the form of Fig. 2. However, in order to guard against dislodgement of the tubular attaching body 40 from the lower end of the faucet 42 under conditions of higher water pressure than usual, a safety valve structure is employed in a water by-pass. This water by-pass is in the form of a tube 60 whose lower end is appropriately secured to the perforated supporting plate 36, the body of the tube leading upward through the hardened layers 32 and 35 and the filter bed 34, so that the upper end of the tube communicates directly with the flow passage 48 below the screen 50. The lower end of the tube 60 provides a seat for a frusto-conical valve member 62 which is carried on the inner end of a curved spring 64 secured as by rivets 65 to the perforated supporting plate 36. Should water pressure become excessive as by opening the faucet valve too much, the valve 62 at the lower end of the by-pass tube 60 will open and permit the excess pressure to be vented by direct passage of water through the tube 60 to the discharge port 31. As to the filter unit 32, 34, 35, this may be the same as that of the form of Fig. 2 where the lower and upper portions are hardened porous layers of activated carbon bound by a phenol resin or the like, and the intermediate portion is a relatively large bed of loose activated carbon particles. The fine dotted lines serve to indicate the places of division between such portions. However, it may be acceptable sometimes to combine these portions into substantially one filter element wherein all the portions are hardened together as one element. Here the middle portion 34 may contain the same amount of binder as the others, or a little less to render it somewhat more efficient as an adsorbent than if containing the same amount of binder. While this form is not a preferred form, it is nevertheless sufficient for some purposes and is more economical to produce than where the portions are separate and the middle section is composed of loose particles.

A further modification is illustrated in Fig. 6 wherein substantially the same filter casing 30, tapering bottom wall 30a, central discharge port 31, cylindrical body member 40 and flat integral rubber closure flange 44a, are employed as in the form of Fig. 3, substantially the same annular cover and clamp ring 46 being used to secure the parts together in the same manner. However, Fig. 6 illustrates certain variations. Thus, instead of employing a screen to support the lower filter layer 32 while undergoing positioning and hardening, a supporting bed or mat 70 of appropriate material is employed to fill the bottom of the casing 30 below the position of the lower layer 32. This material 70 may be a fibrous mass or a granular mass. This material 70 which will be loose is retained by a disc-like screen 72 which may be permanently maintained in position with the supporting material 70 or be eventually removed. In building up the filter bed within the casing 30, loose material of filtering characteristics, such as the previously described activated carbon, containing the previously indicated amount of phenolic resin or other binder, is placed upon the supporting mat 70, whereupon the bed 34 of loose filter material is deposited upon the layer 32. The bed of loose material 34 having been properly spread, a layer 35 of appropriate filtering material treated with phenolic resin or other binder as previously indicated is then disposed upon the top of the filter bed 34. This assembly is then heat-treated to set the lower and upper filtering layers 32 and 35. In this particular form a perforated metal disc 74 having the same diameter as the internal diameter of the casing 30 and also having a central depending imperforate cup 75, is positioned upon and above the upper filtering layer 35 which now is in a hardened, porous condition. The rubber body 40 has the annular flange 44a as before. The rubber flange 44a carries on its under side a depending annular bead 76 which is integral with such flange and fits neatly within the upper portion of the casing 30. This annular bead 76 acts as a resilient spacer ring, its resilience serving to supply a certain amount of compressive force on the upper annular area of the perforated plate 74, and thence through the bottom of the cup 75 to the hardened upper filter layer 35. The plate 74 and its cup 75 serve with this particular form in place of the parts 50 and 51 of forms of Figs. 2 and 3, to protect the filter layer 35 against injury by unintended forcing of the spout 42 too far through the rubber body 40. Normal positioning of the end of the spout 42 is indicated in broken lines.

Fig. 6 is also indicative of a somewhat different construction of the filter layers 32 and 35, in that, instead of using a granular material with the binder, a fibrous material of inert characteristics may be used, such as the well known mineral wool or glass wool, the latter being known on the market for example as "Fiberglas." Here, the inert fibrous material is combined with the previously indicated amount of the phenolic resin or other appropriate binder which is hardened in the same way. Inasmuch as these fibrous layers, although being efficient filters, tend to increase pressure drop through the filter unit, such layers 32 and 35 may be made somewhat thinner than where granulated activated carbon, sand or the like is employed. Thus in a filter device of given dimensions, the loose filter body 34 may be somewhat thicker than otherwise in order to avoid any increased pressure drop.

Although phenolic resins, such as phenolformaldehyde resins, have been mentioned as binders, it is obvious that other well known synthetic resins and the like may be employed as binders to produce the described layers 32 and 35. There are a great many appropriate thermosetting resins on the market well known in the trade which may be used. One other bonding material which may be particularly mentioned is polyvinyl chloride which may be dissolved in acetone or other suitable solvent and mixed with the granular activated carbon, or other granular material mentioned, or the described inert fibrous material. When the corresponding portions of the respective filter are dried, a hard bonded cake results, which may be further treated as deemed necessary or desirable.

There is a great advantage in employing the hardened porous filter layers 32 and 35, especially the lower layer 32, over employing fine screens, filter paper or the like, because apparently the finer particles in the relatively fine mesh material which is used in the filter beds 34 of loose particles work down to the surface of the underlying filter layer. If paper is used, these particles soon plug up the pores of the paper and create a serious pressure drop, with resultant loss in filtering efficiency. However, when a hardened porous layer of considerable thickness such as here described is used, the fine particles which plug the pores of the filter paper work down into the pores of the hardened filter layer 32 so that they are well distributed, thereby leaving numerous laterally extending passageways around the small particles collected. Thus, while the bonded layer 32, in such forms as those of Figs. 2 and 6, and the bonded layer 22 in the form of Fig. 1, function in one respect as fine screens or filter paper, at the same time such bonded layers offer effective filtering areas of a great many times the area of filter paper and the like.

From the foregoing, it will be apparent that useful procedural steps, and useful constructions, for the production of filters have been provided. Since other modifications than those indicated will become apparent to those skilled in the art, it is intended to cover all such variations as fall within the true spirit of the invention and within the scope of the patent claims.

We claim as our invention:

1. A method for producing filters including: placing upon a support within a confining casing a support layer of loose granular material commingled with unset binder substance; depositing upon the support layer a bed of loose filter material; placing upon the top of said bed a second layer of loose granular material commingled with unset binder substance; and treating the resultant assembly in said casing to harden said binder substance in the two layers in situ on said support and within said casing.

2. A method as in claim 1 wherein said granular material of said two layers contains about 10% to 20% of its weight of said binder substance, whereby to yield porous layers following said treating.

3. A method as in claim 1 wherein said granular material of said layers contains minor binding proportions of a thermosettable substance as said binder substance in proportions to form hardened, yet porous layers of said granular material to act as filter layers and to retain said bed of loose filter material in position between them in said casing.

4. A method for producing a water filter including: placing upon a foraminous support within a casing wall a layer of loose filtering material intermingled with a minor proportion of unset binding substance capable of being hardened by the application of heat to bind the filtering material into a hardened layer, the binding substance being in small enough proportion to yield a porous hardened layer; depositing upon said support layer a bed of filtering material in loose form substantially free from a binding substance, whereby to remain loose; depositing upon the surface of said bed of filtering material another layer of loose filtering material also intermingled with a minor proportion of unset binding substance to be hardened by application of heat while leaving a porous hardened layer; and subjecting the thus assembled layers and bed in said casing to heat to harden said binding substance to form hardened porous layers retaining said loose filter bed between them.

5. A method as in claim 4 and the additional step of attaching to an upper portion of said casing wall a connection device for mounting said filter on a water supply device.

6. A method for producing filters including: placing upon a support capable of passing a liquid a layer of filter material commingled with unset binding substance; depositing upon such layer a bed of filtering material; placing upon the top of the bed of filtering material a second layer of filtering material commingled with unset binding substance; and treating such materials so assembled in said casing to harden said binding substance in said two layers for retention of said bed of filtering material between them, the proportion of binding substance in said two layers being small enough to maintain the two layers porous upon hardening of the substance and sufficient to rigidify the layers upon such hardening.

7. A method for producing a filter including the steps of: placing upon a support capable of passing a liquid a layer of loose filtering material intermingled with a minor proportion of unset binding substance capable of being hardened; depositing upon such layer a bed of loose adsorptive granular filtering material; depositing upon the upper surface of said bed a second layer of loose filtering material also intermingled with a minor proportion of unset binding substance; and subjecting the thus assembled layers with said bed between them in said casing to a hardening treatment to harden said binding substance and harden the two layers to retain said loose bed between them, the proportion of said binding substance being great enough to rigidify the two layers but small enough to maintain a porous condition of the layers when rigidified.

8. A filter including: a casing; hardened porous filtering layers disposed in spaced positions within said casing in engagement with the inner wall thereof in filtering relationship; a filter bed of loose material disposed between said hardened layers and substantially filling the space therebetween; and attachment means at an end of said casing for attaching the filter to a source of fluid to be filtered, such attachment means including a neck having an inner yieldable end within said casing and bearing against the outer surface of the adjacent hardened porous layer.

9. A filter as in claim 8 including foraminous means in said inner end of said neck to strain fluid passing to the adjacent hardened porous layer.

10. A filter according to claim 8 including a rigid foraminous supporting member against the outer face of the hardened layer in the end of said casing opposite from said neck and rigidifying the respective hardened layer.

11. A filter as in claim 8 wherein said bed of loose material comprises granular particles of sizes between about 20 mesh and about 60 mesh, and at least one of said porous filtering layers is of appreciable thickness to receive fine particles from said filter bed without significant clogging of such layer whereby continuously to pass liquid through said layers without substantially increased pressure drop.

12. A filter structure including: a casing; a hardened porous lower layer of filtering material in said casing; a bed of loose granular filter material disposed upon said hardened layer; and an upper hardened porous layer of filtering material disposed upon said bed, said hardened layers maintaining the position of said bed between them in said casing, said hardened filter layers comprising filter material whose particles are bonded together with a hardened thermosetting binder material in proportions small enough to leave the hardened layer sufficiently porous to pass therethrough liquid to be filtered and without material pressure drop through the filter, such hardened layers being of substantial thickness whereby their pores may receive fines of said loose filter bed without substantial clogging of the pores of such layers to produce substantial pressure drop in such layers.

References Cited in the file of this patent

UNITED STATES PATENTS

| | | |
|---|---|---|
| 9,760 | Jennison | May 31, 1853 |
| 133,953 | Savery | Dec. 17, 1872 |
| 335,581 | Hallowell | Feb. 9, 1886 |
| 433,710 | Aims, Jr. | Aug. 5, 1890 |
| 494,837 | Bellamy | Apr. 4, 1893 |
| 1,620,815 | Kerschlowitsch et al. | Mar. 15, 1927 |
| 1,914,829 | Imhoff | June 20, 1933 |
| 2,103,572 | Wells | Dec. 28, 1937 |
| 2,297,248 | Rudolph | Sept. 29, 1942 |
| 2,436,077 | Robertson | Feb. 17, 1948 |
| 2,664,278 | Aghnides | Dec. 29, 1953 |